United States Patent [19]
Yoshikawa

[11] Patent Number: 5,492,677
[45] Date of Patent: Feb. 20, 1996

[54] CONTAMINATED AIR PURIFYING APPARATUS

[75] Inventor: Hideo Yoshikawa, Yachiyo, Japan

[73] Assignee: Ajiawasu Kabushiki Kaisha, Tokyo, Japan; a part intrest

[21] Appl. No.: 146,748

[22] Filed: Nov. 3, 1993

[30] Foreign Application Priority Data

| Jun. 2, 1993 | [JP] | Japan | 5-156159 |
| Jun. 2, 1993 | [JP] | Japan | 5-156160 |
| Jul. 9, 1993 | [JP] | Japan | 5-194239 |
| Sep. 20, 1993 | [JP] | Japan | 5-256480 |
| Sep. 20, 1993 | [JP] | Japan | 5-256481 |

[51] Int. Cl.$^6$ ............ F01N 3/10; B01D 50/00; B01J 19/08; B03C 3/38
[52] U.S. Cl. ........ 422/174; 422/169; 422/186.1; 95/61; 95/62; 95/98; 96/3; 96/17; 96/54; 96/55; 96/58
[58] Field of Search .......... 422/169, 174, 422/177, 186.1; 95/57, 61, 62, 79, 95, 98, 66; 96/3, 15, 17, 54, 55, 58

[56] References Cited

U.S. PATENT DOCUMENTS

| 2,973,054 | 2/1961 | Kurtz | 96/66 |
| 3,633,337 | 1/1972 | Walker et al. | 96/54 |
| 3,724,174 | 4/1973 | Walkenhorst | 96/54 |
| 3,739,552 | 6/1973 | Webster et al. | 96/54 |
| 3,740,927 | 6/1973 | Vincent | 96/54 |
| 3,883,328 | 5/1975 | Spain | 96/98 |
| 4,029,482 | 6/1977 | Postma et al. | 96/66 |
| 4,205,969 | 6/1980 | Matsumoto | 96/66 |
| 4,231,766 | 11/1980 | Spurgin | 96/79 |
| 4,689,051 | 8/1987 | Noguchi et al. | 96/79 |
| 4,744,910 | 5/1988 | Bossard | 210/748 |
| 5,069,691 | 12/1991 | Travis et al. | 55/126 |
| 5,143,524 | 9/1992 | Inculet et al. | 96/66 |

*Primary Examiner*—Robert J. Warden
*Assistant Examiner*—Christopher Y. Kim
*Attorney, Agent, or Firm*—Steinberg, Raskin & Davidson

[57] ABSTRACT

A contaminated air purifying apparatus capable of decreasing particles such as dust floating in air, soot produced by a combustion engine and the like and air pollutants such as nitrogen oxides (NOx) contained in exhaust gas. Particulates such as dust, soot and the like are electrostatically negatively charged and collected in a purifying filter section by coulombic force. NOx is converted into $N_2$ and $CO_2$ by an action of carbon fiber or carbon particles, resulting in decreased in concentration. The carbon fiber and carbon particles are preferably modified into an increased surface area of 200 to 2000 $m^2/g$.

19 Claims, 11 Drawing Sheets

CONTAMINATED AIR PURIFYING APPARATUS

BACKGROUND OF THE INVENTION

This invention relates to an apparatus for purifying contaminated air, and more particularly to a contaminated air purifying apparatus which is adapted to decrease particulates such as dust or the like floating or suspended in air, particulates such as soot or the like produced by a combustion engine, and air pollutants such as nitrogen oxides (NOx) contained in exhaust gas of a combustion engine or the like.

Conventionally, filtration using various kinds of filters has been used for removing particulates such as dust or the like which is one of air pollutants. However, the filtration often fails to catch particulates of a microscopic size depending on a filter used and tends to cause a filter used to be clogged with particulates of a rather large size.

In view of such a disadvantages, it is proposed that an electric dust collecting equipment is used in combination with or in place of a filter. A typical example of such an electric dust collecting equipment is generally constructed so as to utilize corona discharge due to application of a high voltage to particulates. More particularly, this is accomplished by electrostatically charging particulates by corona discharge due to application of a voltage as high as about 6 to 10 kV thereto and then catching the particulates by means of the electric dust collecting equipment having a voltage of about 3.3 to 6 kV.

Unfortunately, the dust collecting equipment thus constructed causes various problems due to application of a high voltage to particulates, such as generation of large unpleasant sound, production of ozone harmful to the human body and the like. Also, the dust collecting equipment exhibits another disadvantage of being large-sized because it is required to use an insulating material in a large amount.

Further, materials which have been recently noticed as air pollutants include particulates such as soot contained in exhaust gas or the like and NOx. Removal of soot is carried out by collecting it by means of a ceramic filter or the like. Alternatively, it may be made by the above-described electric dust collecting techniques using corona discharge under a high voltage of 6 to 10 kV. However, both techniques fail to be put into practice because they cause a disadvantage of requiring additional equipment when they are applied to a small type combustion engine such as an automobile or the like. Also, they have another disadvantage of causing the equipment to be large-sized.

A decrease in concentration of NOx in exhaust gas is significantly accomplished by an ammonia catalytic reduction method or the like when production of NOx is carried out by a fixed producing source as seen in factory flue gas or the like. However, there has not been yet developed a denitration equipment effective to remove NOx produced by a moving producing source such as an automobile or the like, particularly, a diesel engine.

SUMMARY OF THE INVENTION

The present invention has been made in view of the foregoing disadvantage of the prior art.

Accordingly, it is an object of the present invention to provide a contaminated air purifying apparatus which is capable of significantly decreasing particulates such as dust or the like contained in air, particulates such as soot or the like contained in gas exhausted by a combustion engine and air pollutants such as NOx or the like.

In accordance with the present invention, a contaminated air purifying apparatus is provided. The contaminated air purifying apparatus includes a contaminated air influx path, an electrifying mesh section containing a porous conductive material and connected to a negative electrode of a DC power supply, and a purifying filter section including a layer containing a conductive material and connected to a positive electrode of the DC power supply. The electrifying mesh section and purifying filter section are arranged in turn in a direction of flow of contaminated air in the contaminated air influx path.

In a preferred embodiment of the present invention, the DC power supply may comprise a cell, wherein the contaminated air purifying apparatus may be used as a mask.

In a preferred embodiment of the present invention, the contaminated air purifying apparatus may further include a high efficiency particulate absolute filter section arranged on a downstream side based on the purifying filter section in the contaminated air influx path.

Also, in a preferred embodiment of the present invention, the contaminated air purifying apparatus may further include a denitration filter section arranged in the contaminated air influx path. The denitration filter section includes a layer containing one of carbon fiber and carbon particles.

The contaminated air purifying apparatus of the present invention constructed as described above permits particulates such as dust in air, soot in exhaust gas and the like to be effectively removed, as well as a concentration of NOx in exhaust gas to be significantly reduced.

In the contaminated air purifying apparatus of the present invention, particulates such as dust in air, soot in exhaust gas and the like are electrostatically negatively charged in the electrifying mesh section and then electrically adsorbed on the purifying filter section by coulombic force. A voltage applied to the particulates for this purpose is as low as 12 to 500 V, resulting in production of unpleasant noise and ozone harmful to the human body being effectively prevented.

Down-sizing of components of the contaminated air purifying apparatus and use of a cell or battery of a low voltage as the power supply permits the apparatus to be used as a mask for covering the nose, the mouth and the like.

Also, incorporation of the high efficiency particulate absolute filter (hereinafter referred to as "HEPA filter") in the contaminated air purifying apparatus permits adsorption and removal of particulates of a rather larger size to be carried out in the purifying filter section and adsorption and removal of particulates of a small size to be carried out in the HEPA filter section. Such arrangement leads to an improvement in durability of the HEPA filter.

Further, incorporation of the denitration filter section in the contaminated air purifying apparatus results in NOx, which mainly consists of NO, being converted into $N_2$ and $CO_2$, as well as a slight amount of CO according to the following expressions:

$$2C + 2NO \longrightarrow N_2 + 2(C-O)$$

$$(C-O) + C + 2NO \longrightarrow N_2 + CO_2 + (C-O) + \Delta H$$

$$(C-O) \xrightarrow{\Delta H} CO$$

wherein C is derived from carbon fiber or carbon particles and (C—O) is an intermediate product and designates an active group.

The contaminated air purifying apparatus of the present invention can be directed to a variety of applications. For example, it may be applied to ventilation in a dwelling house and an office building and ventilation in vehicles such as an automobile, a train, a ship, an airplane and the like; ventilation and sterilization in a hospital, a clean room, a bacteria culture room, various research facilities, food producing facilities, cosmetic producing facilities, medicine producing facilities, facilities for producing electronic equipments and the like; and ventilation of facilities in which electronic equipments such as computers, word processors and the like are installed and protection of the electronic equipments. Also, it may be applied to masks for prevention of pollinosis, house dust, a cold and the like; and working and medical masks for prevention of suction of dust such as soot, fly ash, asbestos, bacteria and the like. Further, it may be used as an exhaust gas purifying apparatus for a fixed combustion engine such as a boiler, a heating furnace or the like, as well as for a moving combustion engine such as an automobile, a ship, a train, an airplane or the like. In particular, it is conveniently used as an exhaust gas purifying apparatus for a diesel engine.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENTS

Figure 1:
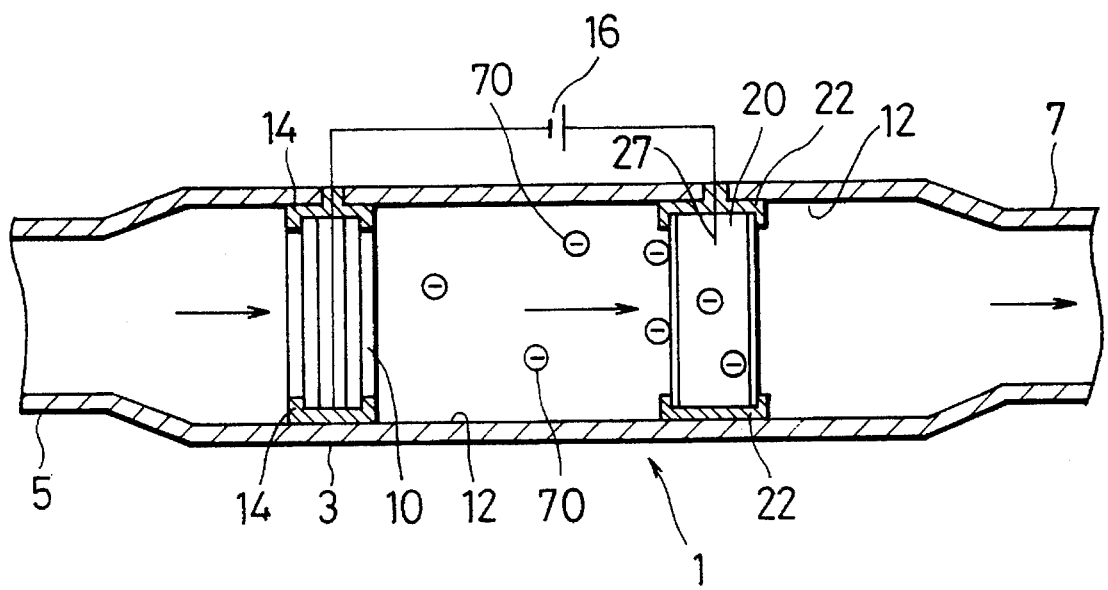
FIG. 1 is a longitudinal sectional view showing an embodiment of a contaminated air purifying apparatus according to the present invention.

Now, a contaminated air purifying apparatus according to the present invention will be described hereinafter with reference to the accompanying drawings.

Referring first to FIGS. 1 to 5, an embodiment of a contaminated air purifying apparatus according to the present invention is illustrated, which is adapted to treat or purify contaminated air containing particulates such as dust or the like.

A contaminated air purifying apparatus of the illustrated embodiment which is generally designated at reference numeral 1 includes an air flow pipe 3 constituting a contaminated air influx path (hereinafter referred to as "air flow path" or "exhaust gas flow path"). The air flow pipe 3 is provided therein with an electrifying mesh section 10 and a purifying filter section 20, which are arranged in order from an air inlet or suction port 5 or in a direction in which contaminated air flows in the air flow pipe 3 as indicated at arrows in FIG. 1. In the illustrated embodiment, the air flow pipe 3 is an example of the air flow path. Therefore, in the present invention, the air flow path may be formed by an air flow pipe member provided with an air inlet port and an air outlet port and a closed vessel or container of desired configuration and volume such as a cylindrical container of an increased diameter.

The electrifying mesh section 10 is arranged in the air flow pipe 3 through a support 14 in a manner to be fitted in an inner surface 12 of the air flow pipe 3 and perpendicular to a longitudinal direction of the air flow pipe 3 or a direction indicated at the arrows in FIG. 1. Also, the electrifying mesh section 10 is electrically connected through a conductor 27 to a negative electrode of a DC power supply 16. The support 14 is preferably formed of an electrically insulating material so as to prevent a current from flowing from a positive electrode of the power supply to the negative electrode thereof through the air flow pipe 3 which constitutes a body of the contaminated air purifying apparatus 1. The DC power supply preferably generates a voltage of about 12 to 500 volts.

A conductive material of which the electrifying mesh section 10 is made is not limited to any specific material so long as it is air-permeable. The electrifying mesh section 10 may be formed of any suitable material such as a net material of 40 to 500 meshes, a punched metal material of 40 to 500 meshes, a woven fabric material of 40 to 500 meshes, a nonwoven fabric material. The materials therefor include, for example, carbon fiber felt, carbon fiber cloth, stainless steel wire net, stainless steel wire felt, synthetic fiber woven fabric to which powders of metal such as copper, titanium, nickel, iron or the like are applied by electroless plating or electroplating or by means of an adhesive material, and synthetic fiber nonwoven fabric having such metal powders as described above applied thereto by techniques as described above. Alternatively, formation of the metal powders on the woven or nonwoven fabric may be carried out by coating. Two or more such materials may be used in combination with each other.

The carbon fiber felt or cloth may be made of carbon fiber conventionally known in the art without subjecting it to any treatment. Alternatively, the felt or cloth may be made of carbon fiber which has been subjected to a modification treatment or formed into a multi-cellular structure, resulting in a surface area thereof being increased to a level as high as about 200 to 2000 $m^2/g$. Such modified carbon fiber may be obtained by subjecting conventional carbon fiber to any suitable treatment. For example, it may be obtained by contacting conventional carbon fiber with water vapor of a temperature as high as about 1000° C. for about 1 to 2 hours. Alternatively, it may be prepared by contacting the carbon fiber with nitrogen monoxide gas at a temperature of about 100° to 500° C. for about 7 to 12 hours. Also, it may be prepared by contacting the carbon fiber with a nitric acid solution of up to 63.1% in concentration at a temperature between a room temperature and 75° C. for about 5 minutes to 2 hours.

Figure 4:
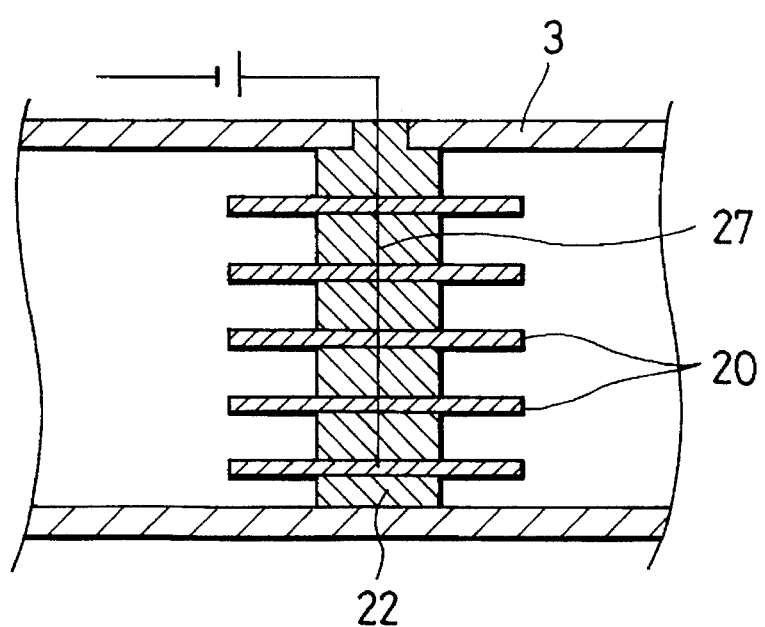
Figure 5:
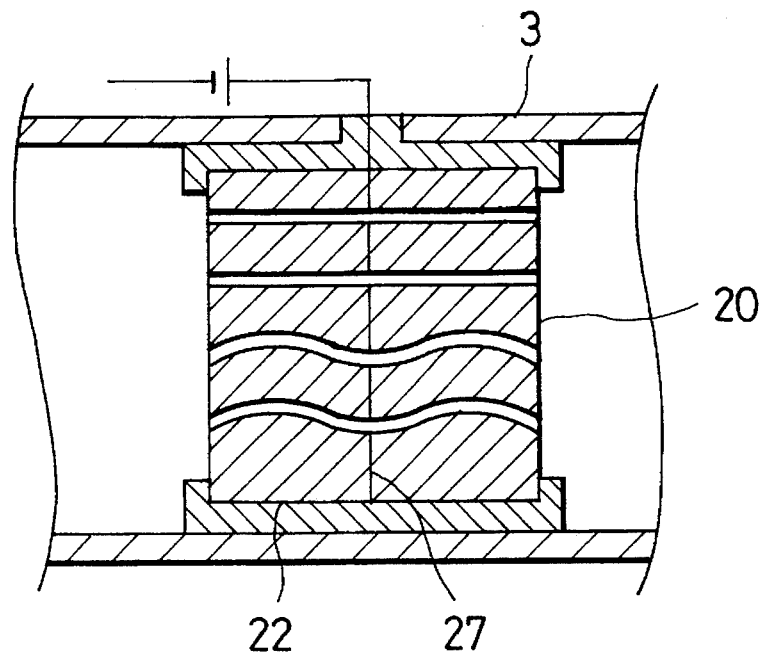

The purifying filter section 20 is arranged in the air flow pipe 3 through a support 22 in a manner to be fitted in the inner surface 12 of the air flow pipe 3 and perpendicular or parallel to the longitudinal direction of the air flow pipe 3 (FIGS. 4 and 5). The purifying filter section 20 is electrically connected to a positive electrode of the DC power supply 16 through the conductor 27. A conductive material for the purifying filter section 20 and a material for the support 22 may be the same as those for the electrifying mesh section 10 and support 14 described above.

The purifying filter section 20 may include a layer containing carbon fiber or carbon particles or a layer containing felt or cloth made of carbon fiber or carbon particles. Alternatively, it may include a layer containing an electrically conductive material other than carbon fiber and carbon particles described above. The carbon fiber or the felt or cloth made of carbon fiber used for this purpose may be the modified carbon or the felt or cloth made of the modified carbon fiber described above with respect to the electrifying mesh section 10. The carbon particles may be modified in substantially the manner as the above-described modification of the carbon fiber.

Figure 2:
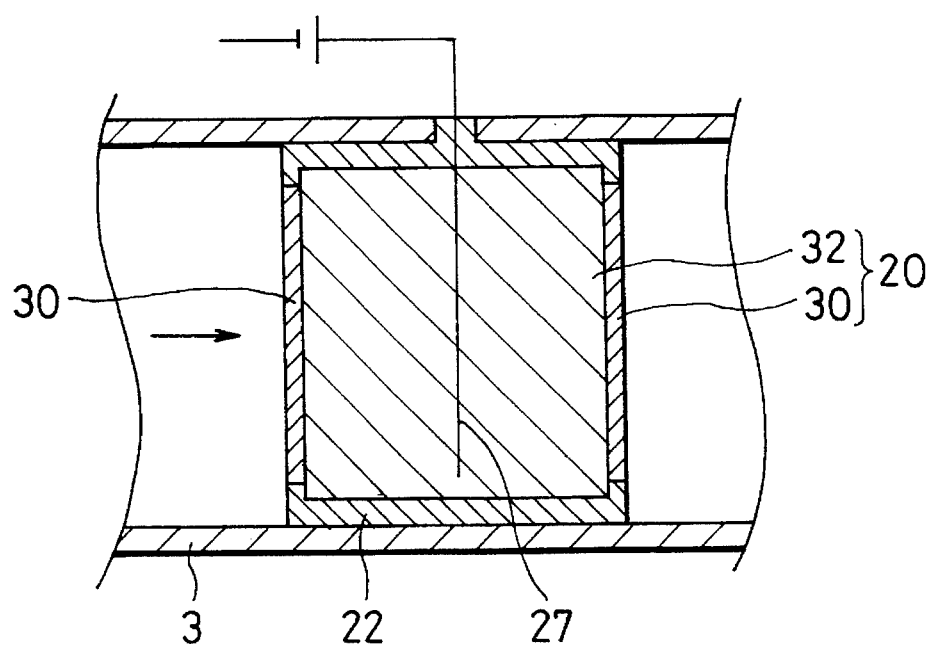
FIGS. 2 to 5 each are a longitudinal sectional view showing a purifying filter section which is adapted to be incorporated in a contaminated air purifying apparatus of the present invention.
Figure 3:
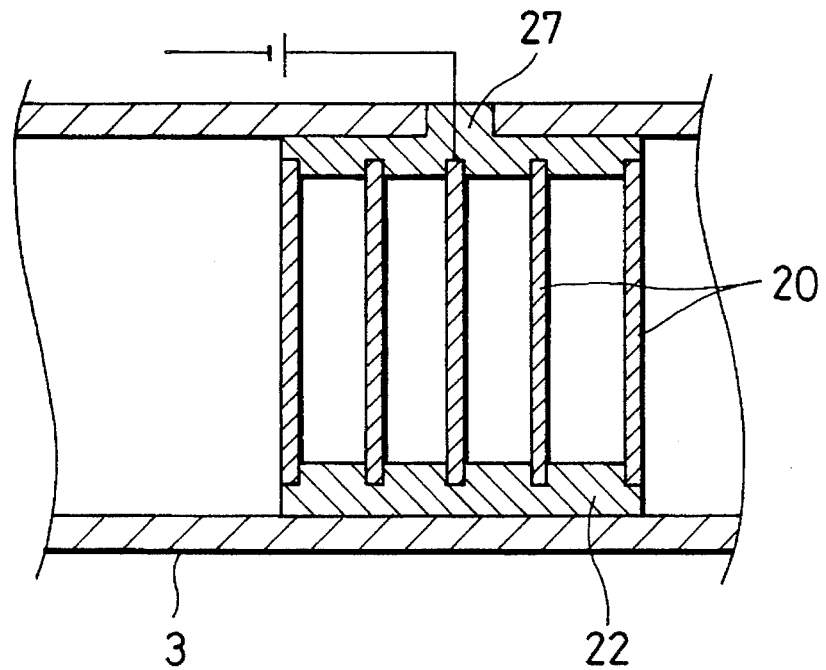

The purifying filter section 20 may be constructed into any desired structure depending on the electrically conductive material used therefor. For example, as shown in FIG. 2, it may be constructed into a structure wherein felt 32 made of carbon fiber is interposedly arranged between woven or nonwoven fabrics 30 made of synthetic fiber having copper powders applied thereto by electroless plating or electroplating. The woven or nonwoven fabric 30 may be replaced with stainless steel wire net and the felt 30 may be replaced with stainless steel wire net or stainless steel wire felt. Also, as shown in FIG. 3, it may be formed by arranging a plurality of such electrically conductive materials as described above in a manner to be spaced from each other at intervals of 2 to 5 mm. Further, as shown in FIG. 4, it may be formed by arranging a plurality of the electrically conductive materials so as to be spaced from each other at intervals of 2 to 5 mm and in parallel with each other. Alternatively, as shown in FIG. 5, it may be constructed by forming the carbon fiber felt materials or stainless steel wire felt materials with a plurality of through-holes of any desired configuration. Formation of such through-holes is carried out for the purpose of reducing a pressure loss. The through-holes each are preferably formed into a shape extending in a corrugated manner in a longitudinal direction of the purifying filter section 20, because such a shape permits the electrically conductive material to be significantly increased in area contacted with air to be treated.

The contaminated air purifying apparatus 1 may include a filter made of, for example, wire net and functioning to filter dust of a rather large size such as lint or the like, which may be arranged on an upstream side in the air flow path based on the electrifying mesh section 10. Also, an air blower for forcibly feed air to the contaminated air purifying apparatus 1 or the like may be provided at any desired position.

Further, the contaminated air purifying apparatus of the illustrated embodiment may include a plurality of sets of electrifying mesh section and purifying filter section combination combinations each comprising the electrifying mesh section and purifying filter section.

Figure 6:
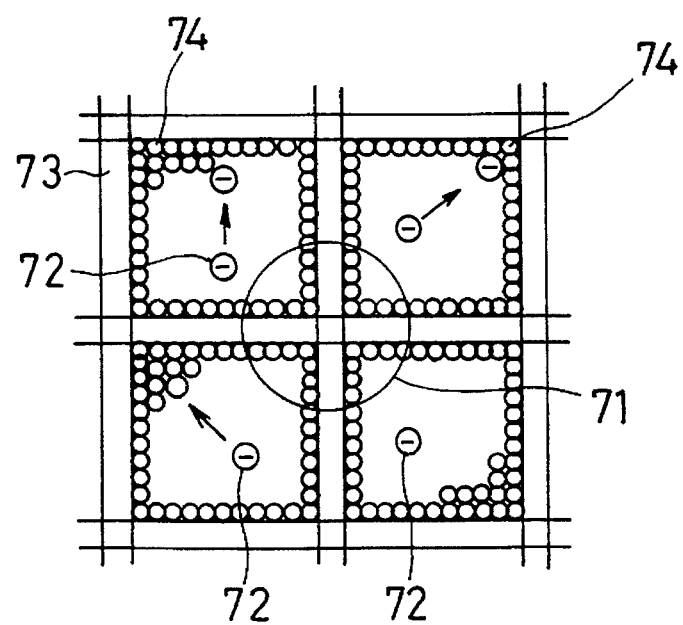
FIGS. 6 and 7 each are a schematic view showing adsorption of particulates on a purifying filter section.
Figure 7:
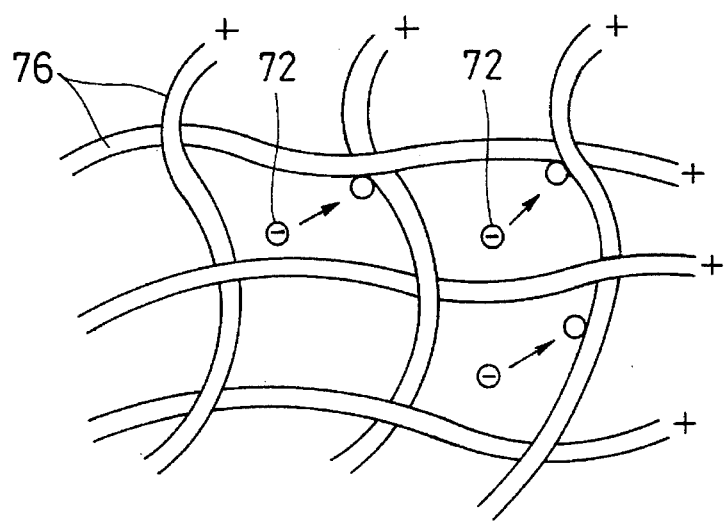

Now, the manner of operation of the contaminated air purifying apparatus of the illustrated embodiment constructed as described above will be described hereinafter with reference to FIGS. 1, 6 and 7.

Contaminated air introduced through the air inlet or suction port 5 into the air flow pipe 3 of the contaminated air purifying apparatus 1 is guided to the electrifying mesh section 10, wherein dust 70 which is kept electrically neutral is electrostatically negatively charged. Then, the air is guided to the purifying filter section 20, resulting in the negatively charged dust being electrostatically adsorbed on the purifying filter section 20 by coulomb force and kept adsorbed thereon. Now, the adsorption will be described in connection with the purifying filter section 20 made of a composite material prepared by interposedly arranging carbon fiber felt between woven or nonwoven fabric layers made of synthetic fiber having copper powders applied thereto by electroless plating or electroplating, as shown in FIG. 2. First, dust 71 of a relatively large size is adsorbed as shown in FIG. 6 and dust 72 of a relatively small size is adsorbed on copper powders 74. Dust 72 which passed therethrough is adsorbed on a surface of carbon fiber felt 76 as shown in FIG. 7. The air passing through the carbon fiber felt 76 is subject to such an adsorption treatment as shown in FIG. 6 again. The air thus purified is outwardly discharged through an air outlet or discharge port 7 to an exterior of the contaminated air purifying apparatus 1.

The purifying filter section 20 is turned off and then external vibration is applied thereto, so that dust adsorbed on the purifying filter section 20 may be removed therefrom. Thus, the purifying filter section 20 and therefore the contaminated air purifying apparatus 1 may be operated over a long period of time. Alternatively, the purifying filter section 20 may be detached from the contaminated air purifying apparatus 1 for cleaning.

Use of carbon fiber or the like subjected to a modifying treatment permits the contaminated air purifying apparatus to effectively exhibit a deodorizing function in addition to a dust collecting function.

TEST EXAMPLE 1

Figure 8:
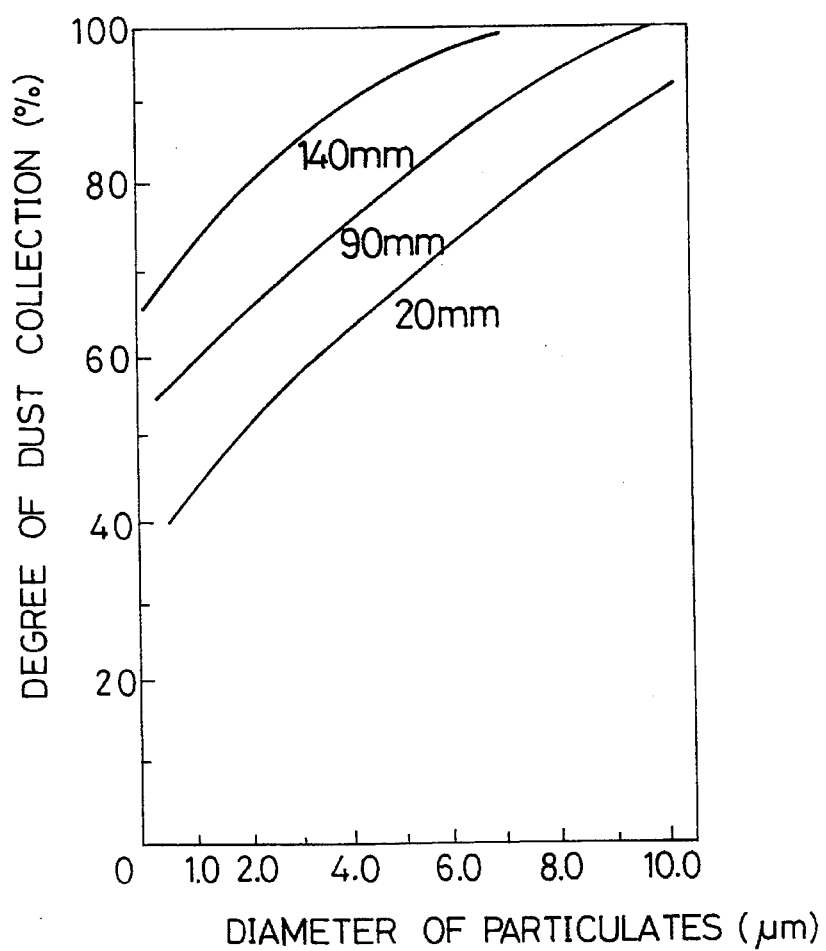
FIGS. 8 to 10 each are a graphical representation showing results of a dust collecting test carried out using a contaminated air purifying apparatus of the present invention.

A dust collecting test was carried out using a contaminated air purifying apparatus constructed in such a manner as shown in FIG. 1. The results were as shown in FIG. 8.

Test Procedure

Cigarette smoke was continuously blown upon an air inlet port from the human mouth, and the number of particulates (particle diameter: 0.3 to 10 μm) at the air inlet port of the contaminated air purifying apparatus and that at an air outlet port thereof were measured. The measurement was carried out by means of a particle counter having a read function by laser. A degree of dust collection was obtained according to the following expression:

Degree of Dust Collection (%)=(A−B)/A×100 wherein A is the number of particulates at the air inlet port and B is the number of particulates at the air outlet port.

Test Conditions

Electrifying mesh section: Six pieces of stainless steel wire net (200 meshes, 380 mm×125 mm) were used for an electrifying mesh section.

Purifying filter section: A purifying filter section was constructed by interposing carbon fiber felt (length of fiber: 14 μm, thickness of felt: 20, 90 and 140 mm) between two pieces of non-woven fabric having copper powders applied thereto by electroless plating in a manner as shown in FIG. 2. Thus, three kinds of purifying filter sections different in thickness of carbon fiber felt were prepared.

Voltage applied: 50 V

Flow rate of air introduced: 3 m³/min

TEST EXAMPLE 2

Figure 9:
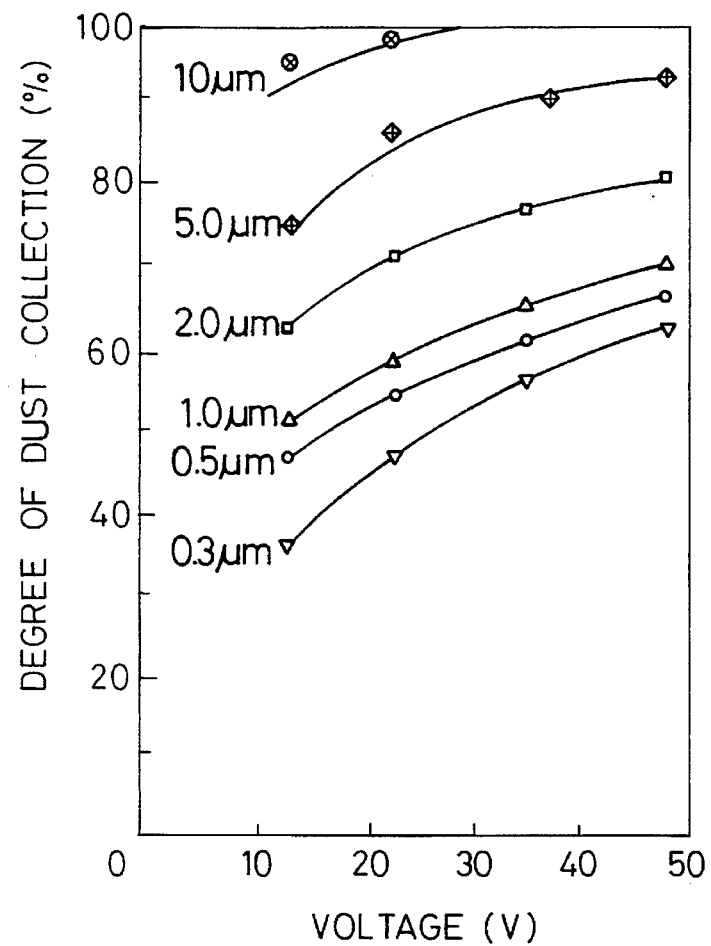

FIG. 9 shows the results of FIG. 8 which are represented by a degree of dust collection obtained depending on a voltage and a diameter of particulates. The results shown in FIG. 9 relate to only the carbon fiber felt of 140 mm in thickness.

TEST EXAMPLE 3

Figure 10:
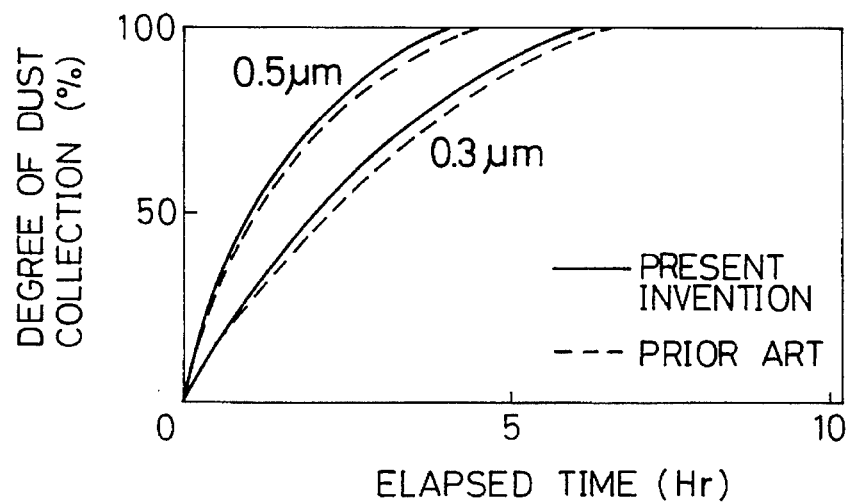

A dust collecting test was carried out using a contaminated air purifying apparatus constructed in such a manner as shown in FIG. 1. Results of the test were as shown in FIG. 10.

Test Procedure

The number of particulates produced by burning five incense sticks in a closed space of 1.94 m³ in volume were measured by means of the above-described particle counter. Then, the contaminated air purifying apparatus of the present invention was operated in the same closed space, resulting in the number of particulates remaining in the space being measured at every predetermined time interval to obtain a degree of dust collection in connection with particulates of 0.3 and 0.5 μm in particle diameter according to the following expression:

Degree of Dust Collection (%)=(C−D)/C×100 wherein C is the number of particulates prior to the operation and D is that after the operation. For comparison, the test was repeated on the prior art. The results were as shown in FIG. 10.

Test Conditions (Present Invention)

Electrifying mesh section: Seven pieces of nonwoven fabric each having copper powders applied thereto by electroless plating were used for an electrifying mesh section.

Purifying filter section: A purifying filter section was used which is constructed by interposing carbon fiber felt (thickness: 10 mm) between two pieces of nonwoven fabric each having copper powders applied thereto by electroless plating (see FIG. 2).

Voltage applied: 200 V (Prior Art)

Electrifying section: Electrodes for corona discharge under 6.6 kV were used for an electrifying section.

Dust collecting section: Two sets of 3.5 kV electrodes each comprising 37 electrode plates were used for a dust collecting section.

Figure 11:
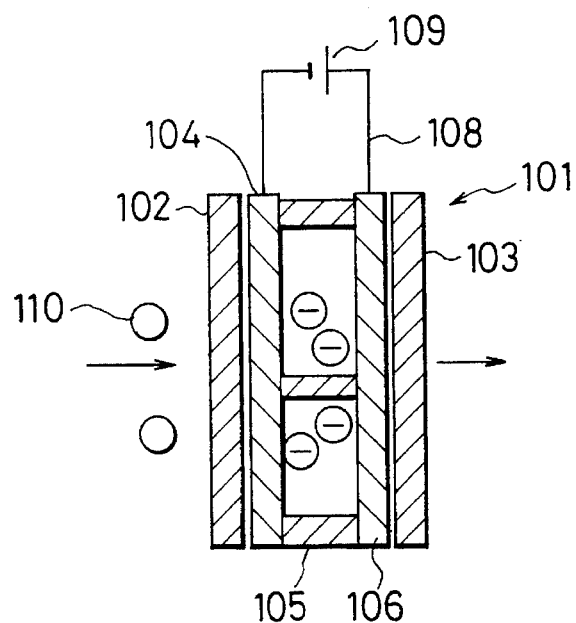
FIG. 11 is a sectional view showing a contaminated air purifying apparatus of the present invention which is embodied in the form of a mask.

Referring now to FIGS. 11 and 12, a second embodiment of a contaminated air purifying apparatus according to the present invention is illustrated, wherein contaminated air to be treated contains particulates such as dust and the like. A contaminated air purifying apparatus of the second embodiment is adapted to be used as a mask and includes an electrifying mesh section and a purifying filter section which are constructed in substantially the same manner as those in the first embodiment.

A mask 101 in which the present invention is embodied includes an outer mesh section 102, an electrifying mesh section 104, a purifying filter section 106 and an inner mesh section 103 which are arranged in turn in a direction of flow of contaminated air indicated at arrows in FIG. 11. The mask 101 also includes an insulation section 105 arranged between the electrifying mesh section 104 and the purifying filter section 106.

The outer mesh section 102 functions to catch dust of a large diameter. The outer mesh section 102 may be made of any suitable material such as open weave fabric such as gauze, woven fabric of synthetic fiber, wire net or the like. The inner mesh section 103 may be formed of any suitable material so long as it exhibits air-permeability. However, in the illustrated embodiment, the inner mesh section 103 is contacted with the skin, therefore, it is preferably made of a material harmless to the human body such as gauze, woven fabric of synthetic fiber or the like.

The electrifying mesh section 104 is arranged so as to be perpendicular to the direction of flow of the contaminated air described above and electrically connected through a conductor 108 to a negative electrode of a power supply 109. The power supply 109 may comprise a plurality of small-sized and light-weight cells of a low voltage connected together as required. A voltage of the power supply 109 is preferably within a range between about 1.5 V and about 15 V.

The purifying filter section 106 is arranged in a manner to be perpendicular to the direction of flow of the air and electrically connected through the conductor 108 to a positive electrode of the power supply 109. The purifying filter section 106 may be formed by filling powdered activated charcoal prepared from wood waste, coal, coconut shell or the like in a bag of synthetic resin. Carbon fiber may be substituted for the powdered activated charcoal. The powdered activated charcoal used preferably has a particle diameter of 1 mm or less because it effectively prevents a thickness of the mask 101 from being excessively or significantly increased.

Also, the mask 101 may include a plurality of sets of electrifying mesh section and purifying filter section combinations, wherein each combination comprises the electrifying mesh section 104 and purifying filter section 106.

Now, the manner of operation of the mask constructed as described above will be described hereinafter with reference to FIG. 11.

Dust of a rather large size contained in contaminated air is caught by the outer mesh section 102. Dust 110 in the air which passes through the outer mesh section 102 without being caught by the section 102 is electrostatically negatively charged in the electrifying mesh section 104. Then, the dust 110 is adsorbed on the purifying filter section 106. This results in the air being purified, which then passes through the inner mesh section 103, to thereby be used for breathing.

TEST EXAMPLE 4

Figure 12A:
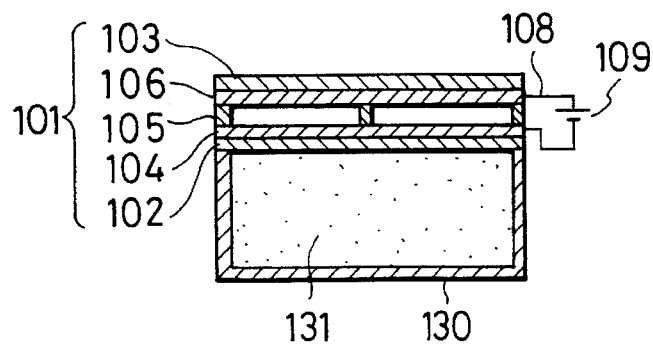
FIG. 12A is a sectional view showing the manner of a dust collecting test carried out by means of the mask shown in FIG. 11.
Figure 12B:
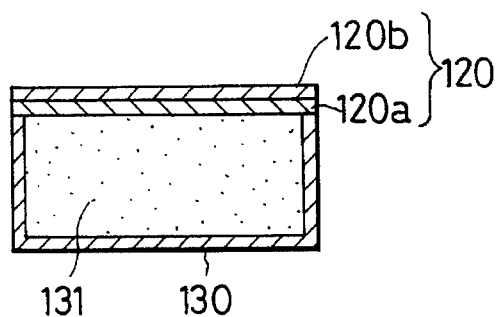
FIG. 12B is a sectional view showing the manner of a dust collecting test carried out by means of a commercially available mask.

Two cylindrical vessels 130 of which a bottom is closed were prepared as shown in FIGS. 12A and 12B and charged with yellow chalk powders (particle diameter: 2 to 10 μm) 131 of the same quantity. Then, an open end or opening of one of the vessels was covered with a mask 101 of the present invention as shown in FIG. 12A and the other vessel was covered with a commercially available mask 120 as shown in FIG. 12B. Then, the masks each were subject to suction by a vacuum cleaner and then subject to visual and microscopic observation. In the mask 101 of the present invention, an electrifying mesh section and a purifying filter section each were made of a single piece of nylon nonwoven fabric (thickness: 0.3 mm) having copper powders applied thereto by electroless plating, an outer mesh section 102 and an inner mesh section 103 each were made of a single piece of gauze, and a power supply (3 V) comprised two cells connected together. The commercially available mask 120 comprised two gauze layers 120a and 120b laminated on each other.

In the commercially available mask 120, the upper gauze layer 120b was rendered yellow one minute after start of the test. On the contrary, in the mask 101 of the present invention, any change was not observed in the inner mesh section 103. Also, enlarged observation of the purifying filter section 106 of the mask 101 through a microscope of 30 magnifications indicated that chalk powders adhered to the nylon fiber and copper powders.

Figure 13:
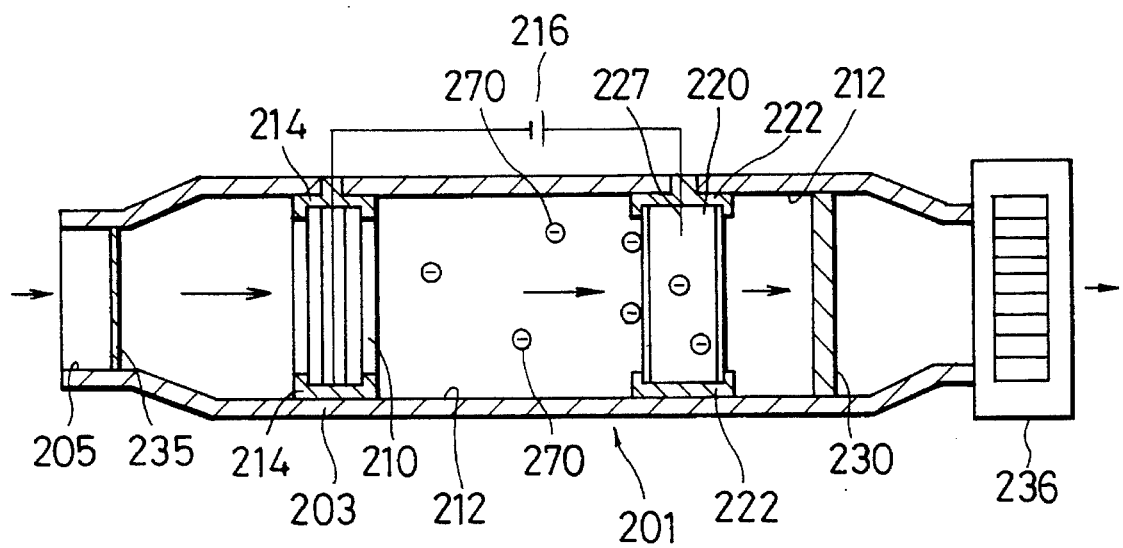
FIGS. 13 to 16 each are a longitudinal sectional view showing another embodiment of a contaminated air purifying apparatus according to the present invention.

Referring now to FIG. 13, a third embodiment of a contaminated air purifying apparatus according to the present invention is illustrated, which is adapted to treat or purify contaminated air containing particulates such as dust or the like. In the third embodiment, an electrifying mesh section and a purifying filter section may be constructed in substantially the same manner as those in the first embodiment described above.

A contaminated air purifying apparatus of the third embodiment which is generally designated at reference numeral 201 in FIG. 13 includes an air flow pipe 203 constituting an air flow path, in which an electrifying mesh section 210, a dust collecting filter 220 and an HEPA filter 230 are arranged in order from an air inlet or suction port 205 or in a direction of flow of contaminated air indicated at arrows in FIG. 13. Reference numeral 235 designates a filter made of wire net or the like, which may be provided as required. 236 is a fan such as an axial blower, a cirrocco fan or the like. In the illustrated embodiment, the air flow pipe 203 is an example of a means for forming the air flow path. Therefore, in the illustrated embodiment, the air flow path may be formed of an air flow pipe of a reduced diameter provided with an air inlet port and an air outlet port and a closed container or vessel of desired configuration and volume such as a cylindrical vessel of an increased diameter or the like connected to the air flow pipe.

The electrifying mesh section 210 is arranged in the air flow pipe 203 in a manner to be fitted in an inner surface 212 of the air flow pipe 210 through an insulating support 214 and perpendicular to a longitudinal direction of the air flow pipe 203 or in the direction of flow of the air in the air flow pipe 203. Also, the electrifying mesh section 210 is electrically connected through a conductor 227 to a negative electrode of a DC power supply 216. The DC power supply 216 preferably generates a voltage of about 12 to 500 volts.

The dust collecting filter section 220 is positioned on a downstream side in the direction of flow of the air based on the electrifying mesh section 210 and arranged on the inner surface 212 of the air flow pipe 203 through an insulating support 222 in a manner to be perpendicular to the longitudinal direction of the air flow pipe 203. Also, the dust collecting filter 220 is electrically connected to a positive electrode of the DC power supply 216 through the conductor 227.

The HEPA filter section 230 is positioned on a downstream side in the direction of flow of contaminated air based on the dust collecting filter section 220 and arranged on an inner surface 212 of the air flow pipe 203 through a seal member (not shown) in a manner to be perpendicular to the longitudinal direction of the air flow pipe 203.

The contaminated air purifying apparatus of the illustrated embodiment may include a plurality of sets of electrifying mesh section and dust collecting filter section combinations each comprising the electrifying mesh section 210 and dust collecting filter section 220. In this instance, one or more such HEPA filter sections 230 may be suitably arranged.

Now, the manner of operation of the contaminated air purifying apparatus 230 of the illustrated embodiment will be described hereinafter with reference to FIG. 13.

Contaminated air introduced through the air suction port 205 into the air flow pipe 203 by an action of the fan 236 is guided to the filter 235, wherein dust of a large size such as lint or the like is removed from the air. Then, the air is guided to the electrifying mesh section 210, wherein dust 270 which is kept electrically neutral is electrostatically negatively charged. Subsequently, the air is fed to the dust collecting filter section 220, so that the dust 270 is adsorbed on the filter section 220 by coulombic force and held thereon. Thus, the air passing through the dust collecting filter section 220 is further guided to the HEPA filter section 230, resulting in being filtered and outwardly discharged through the fan 236.

TEST EXAMPLE 5

A dust collecting test was carried out using a contaminated air purifying apparatus 210 constructed according to the third embodiment described above. The test took place according to the following procedure and under the following conditions. For comparison, a test was carried out using a dust collecting unit comprising only an HEPA filter. Results were as shown in Table 1.

Test Procedure

The number of particulates produced by fully burning three incense sticks which are were placed in an air flow pipe in proximity to an air suction port was measured by means of a particle counter having a read function by laser, to thereby obtain a degree of dust collection for every particle diameter. The degree of dust collection was calculated according to the following expression:

Degree of Dust Collection (%)=$(A-B)/A \times 100$ wherein A is the number of particulates at the air suction port and B is the number of particulates at the air suction port.

Test Conditions

Electrifying mesh section: A piece of nonwoven fabric (300 mm×300 mm) was used for an electrifying mesh section.

Dust collecting filter section: A dust collecting filter section was constructed by interposing a carbon fiber felt layer of 10 mm in thickness between two pieces of nonwoven fabric (300 mm×300 mm) having copper applied thereto by plating.

Voltage applied: 200 V

TABLE 1

|  | Pressure Loss | Degree of Dust Collection (%) | | |
| --- | --- | --- | --- | --- |
|  | (mmAg) | 0.3 μm | 0.5 μm | 1.0 μm |
| Third Embodiment | 18.35 | 88 | 93 | 100 |
| Comparison Example | 18.3 | 78 | 82 | 96 |

Figure 14:
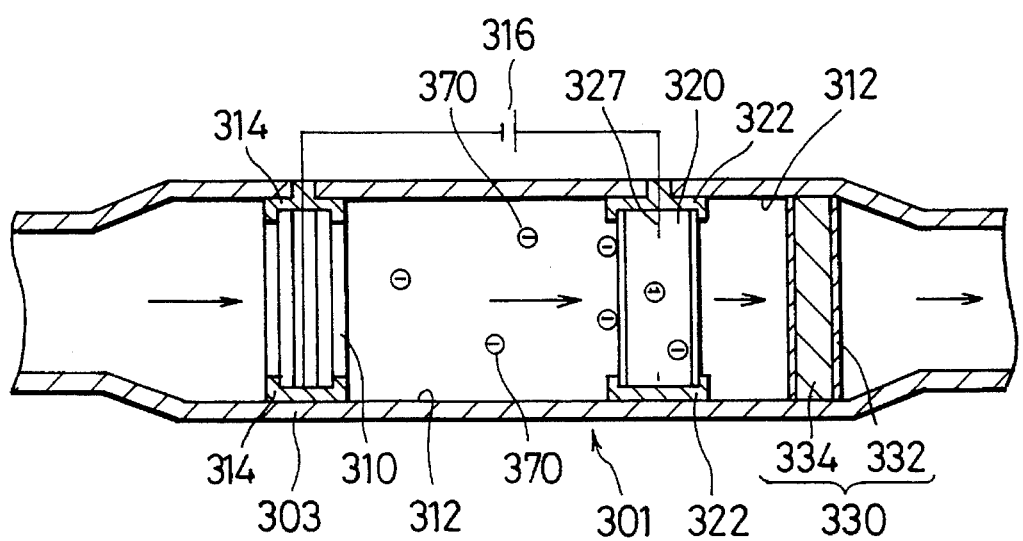
Figure 15:
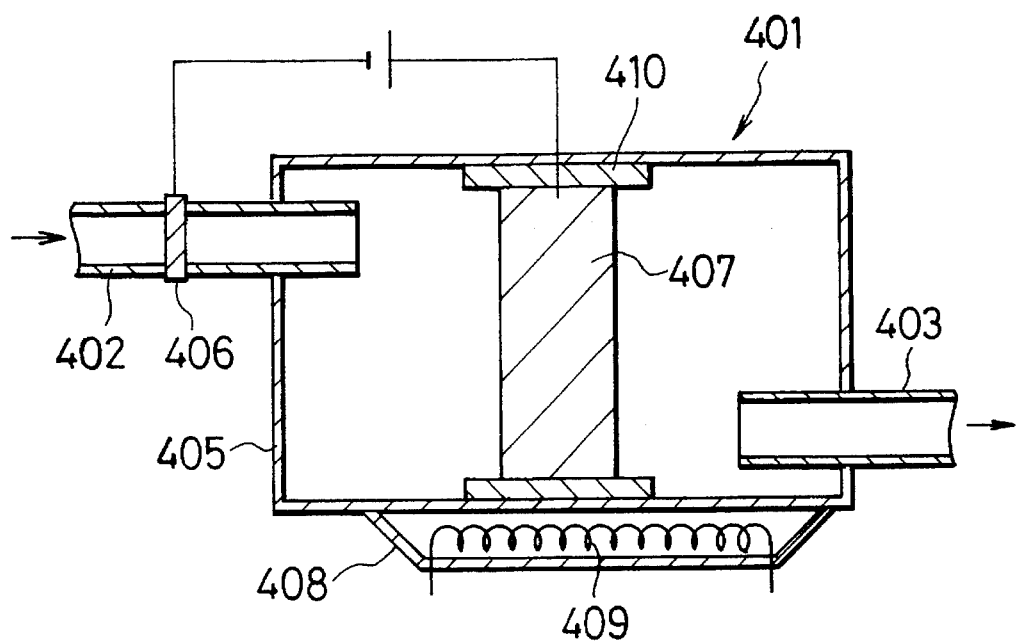
Figure 16:
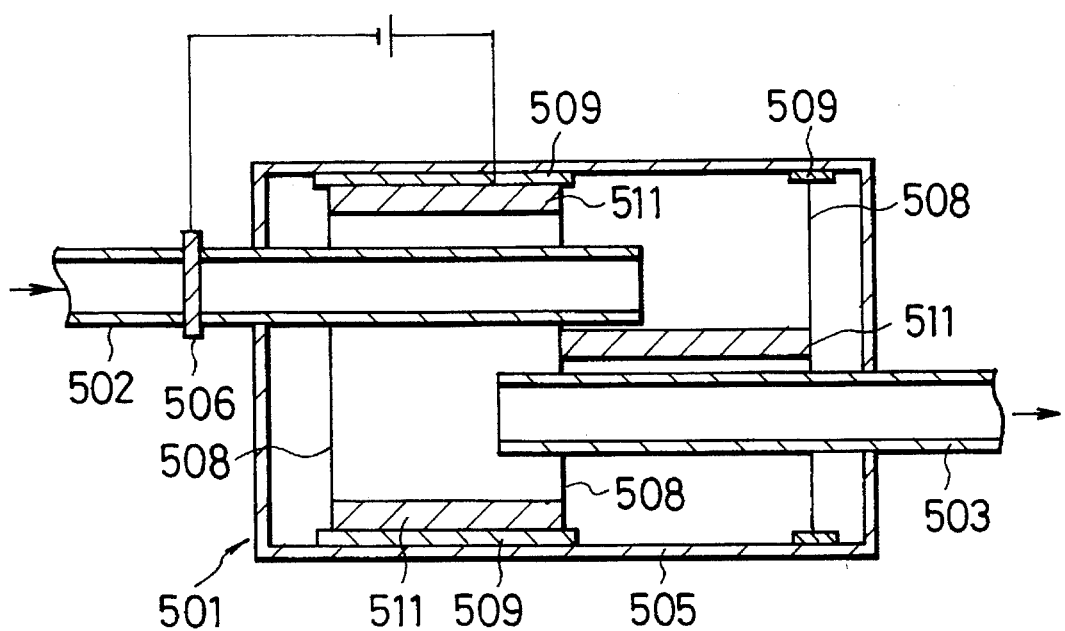

Referring now to FIGS. 14 to 16, a fourth embodiment of a contaminated air purifying apparatus according to the present invention is illustrated, which is adapted to treat or purify exhaust gas of a combustion engine. Thus, a contaminated air purifying apparatus of the fourth embodiment is in the form of an exhaust gas purifying apparatus. In the fourth embodiment, an electrifying mesh section and a purifying filter section may be constructed in substantially the same manner as those in the first embodiment described above.

The contaminated air purifying apparatus of the illustrated embodiment which is generally designated at reference numeral 301 includes an air flow pipe 303 forming an exhaust gas flow path and acting as an exhaust gas flow pipe. The exhaust gas flow pipe 303 is provided therein with an electrifying mesh section 310, a purifying filter section 320 and a denitration filter section 330, which are arranged in turn on a downstream side in the exhaust gas flow pipe 303 based on a combustion engine or in a direction of flow of exhaust gas. In the illustrated embodiment, the exhaust gas flow pipe 303 is an example of a means for forming the exhaust gas flow path. Therefore, in the illustrated embodiment, the exhaust gas flow path may be formed of an exhaust gas flow pipe of a reduced diameter provided with an exhaust gas inlet or suction port and an exhaust gas outlet or discharge port and a closed vessel of desired configuration and volume such as a cylindrical vessel of an increased diameter or the like connected to the exhaust gas flow pipe.

The electrifying mesh section 310 is fittedly arranged in an inner surface of the exhaust gas flow pipe 303 through an insulating support 314 in a manner to be perpendicular to a longitudinal direction of the exhaust gas flow pipe 303 or in the direction of flow of exhaust gas as in the above-described embodiments. Also, the electrifying mesh section 310 is electrically connected through a conductor 327 to a negative electrode of a DC power supply 316. A voltage produced by the DC power supply 316 is preferably about 12 to 500 volts.

The dust collecting filter section 320 is positioned on a downstream side in the direction of flow of exhaust gas based on the electrifying mesh section 310 and fittedly arranged in the inner surface of the exhaust gas flow pipe 303 through an insulating support 322 so as to be perpendicular to the longitudinal direction of the exhaust gas flow pipe 303 in which the exhaust gas flow path is defined. Also, the dust collecting filter section 320 is electrically connected through a conductor 327 to a positive electrode of the DC power supply 316.

The denitration filter section 330 includes a pair of covering elements 332 made of a porous conductive material and a carbon layer 334 made of carbon fiber or carbon particles and interposedly arranged between the covering elements 332. The denitration filter section 330 may be arranged in proximity to a combustion engine as compared with the electrifying mesh section 310 or on an upstream side in the direction of flow of the exhaust gas based on the combustion engine.

The porous conductive material of which the covering elements 332 are made includes a wire net material, a punched metal material and the like, It is preferable that such wire net and punched metal each may be formed into about 40 to 500 meshes because of permitting carbon fiber and carbon particles to be satisfactorily supported thereon.

Any suitable carbon fiber or carbon particles widely known in the art may be used for the carbon layer 334. However, such modified carbon fiber or carbon particles of an increased surface area as described above are preferably used for this purpose. Also, the carbon fiber preferably has a fiber length of 0.5 to 15 μm. The carbon fiber may be used in the form of its original shape. Alternatively, it may be used in the form of woven felt, mat or cloth. The carbon particles preferably have a substantially spherical shape of which a diameter is between 0.01 mm and 2 mm.

Now, the manner of operation of the exhaust gas purifying apparatus 301 will be described hereinafter with reference to FIG. 14.

Particulates such as soot and the like contained in exhaust gas fed from the combustion engine are electrostatically negatively charged in the electrifying mesh section 310 and then absorbed on the purifying filter section 320. The exhaust gas from which the particulates are thus removed is then contacted with the carbon layer 334 in the denitration filter section 330 while still containing nitrogen oxides (NOx) mainly consisting of NO. In the denitration filter section 330, NO is reacted with carbon atoms to form an intermediate product (C–O), which is adsorbed on the carbon layer 334 made of carbon fiber or carbon particles. This causes N to be converted into $N_2$ and the above-described intermediate product adsorbed to be converted into $CO_2$ and a slight amount of CO due to a high temperature atmosphere. Thus, the exhaust gas passing through the denitration filter section 330 is free of particulates and mainly contains $N_2$, $CO_2$ and CO in place of the nitrogen oxides as can be seen form the above-described reactions.

Referring now to FIG. 15, a modification of the exhaust gas purifying apparatus of the fourth embodiment is illustrated. An exhaust gas purifying apparatus of the modification which is generally designated at reference numeral 401 includes an exhaust gas inlet pipe 402, an exhaust gas outlet pipe 403, and an expansion chamber 405 arranged between the exhaust gas inlet pipe 402 and the exhaust gas outlet pipe 403 so as to communicate with both. An electrifying mesh section 406 is arranged in the exhaust gas inlet pipe 402 through an insulating support (not shown). Also, the electrifying mesh section 406 is electrically connected to a negative electrode of a DC power supply (not shown). The exhaust gas purifying apparatus of the modification also includes a purifying filter section 407 carrying thereon or containing carbon fiber or carbon particles and acting also as a denitration filter section. The purifying filter section 407 is arranged in the expansion chamber 405 through an insulating support 410. The purifying filter section 407 is electrically connected to a positive electrode of the DC power supply. The exhaust gas purifying apparatus 401 further includes a soot reservoir 408 arranged below the expansion chamber 405, which soot reservoir is provided on a bottom surface thereof with a heater 409 connected to an external power supply.

Now, the manner of operation of the exhaust gas purifying apparatus 401 of the modification will be described hereinafter with reference to FIG. 15.

Particulates in exhaust gas fed into the exhaust gas inlet pipe 402 are electrostatically negatively charged by the electrifying mesh section 406 and then adsorbed on the purifying filter section 407. The purifying filter section 407 contains carbon fiber or carbon particles, resulting in also serving as the denitration filter section as described above. Therefore, the purifying filter section 407 carries out adsorption of the particulates thereon, as well as denitration. The exhaust gas thus purified is discharged through the exhaust gas outlet pipe 403. The particulates adsorbed on the purifying filter section 407 by repeating the above-described operation, when the power supply is turned off and external vibration is applied to the purifying filter section 407, is caused to drop into the soot reservoir 408, resulting in being collected therein. The particulates thus collected are heated by the heater 409, resulting in being burned to form $CO_2$, which is then discharged through the exhaust gas outlet pipe 403.

Referring now to FIG. 16, another modification of the exhaust gas purifying apparatus shown in FIG. 14 is illustrated. An exhaust gas purifying apparatus of the modification generally designated at reference numeral 501 likewise includes an expansion chamber 505 arranged between an exhaust gas inlet pipe 502 and an exhaust gas outlet pipe 503. An electrifying mesh section 506 is made of stainless steel wire net and arranged in the exhaust gas inlet pipe 502 through an insulating support. Also, the electrifying mesh section 506 is electrically connected to a negative electrode of a DC power supply.

A purifying filter section 508 is made of stainless steel wire net and is arranged in the expansion chamber 505 through an insulating support 509. A denitration filter section 511 which acts also as a purifying filter section is arranged in an inner space of the expansion chamber 505 in a manner to be fitted in an inner surface of the expansion chamber 505. The denitration filter section 511 is electrically connected to a positive electrode of the DC power supply, resulting in serving also as the purifying filter section as described above. Open ends of the exhaust gas inlet pipe 502 and exhaust gas outlet pipe 503 through which both pipes 502 and 503 are permitted to communicate with the expansion chamber 505 are positioned in spaces separated from each other through one of filters of the purifying filter section 508.

Now, the manner of operation of the exhaust gas purifying apparatus 501 will be described hereinafter with reference to FIG. 16.

Particulates such as soot and the like contained in exhaust gas fed from a combustion engine to the exhaust gas inlet pipe 502 are electrostatically negatively charged by the electrifying mesh section 506 as in the contaminated air purifying apparatus 1 of the first embodiment. Then, the particulates are adsorbed on the purifying filter section 508, The above-described open ends of the exhaust gas inlet pipe 502 and exhaust gas outlet pipe 503 are positioned in the inner spaces of the expansion chamber 505 in a manner to be separated from each other as described above, respectively, so that the exhaust gas introduced through the exhaust gas inlet pipe 502 into the expansion chamber 505 may be contacted with the purifying filter section 508. Also, the denitration filter section 511 is electrically connected to the power supply, so that particulates contained in the exhaust gas are likewise adsorbed thereon. The exhaust gas from which the particulates are thus removed is then contacted with carbon fiber or carbon particles contained in the denitration filter section 511 while still containing nitrogen oxides mainly consisting of NO, resulting in the nitrogen oxides being converted into $N_2$, $CO_2$ and CO through a series of reactions as described above. Thus, the exhaust gas is purified and then outwardly discharged through the exhaust gas outlet pipe 503.

Now, examples of combinations of components of the exhaust gas purifying apparatus described above will be described with reference to FIGS. 17 to 20.

In each of FIGS. 17 to 20, reference character "D.E." designates a diesel engine, "Comb. 1" is a combination of the electrifying mesh section and purifying filter section (containing a non-denitration material), and "Comb. 2" is a combination of the electrifying mesh section and purifying filter section (containing the denitration material or the carbon fiber or carbon particles). Thus, it will be noted that the purification filter section in Comb. 2 acts also as the denitration filter section. "D.N.F." designates denitration filter section which is not connected to the power supply. Each solid line between the components indicates the exhaust gas flow path and a degree of length of the solid line indicates a positional relationship between the components. Also, the components may be arranged together in the same closed space (closed vessel or container). Alternatively, they may be arranged separate from each other in two or more closed spaces (closed vessels or containers).

Figure 17:
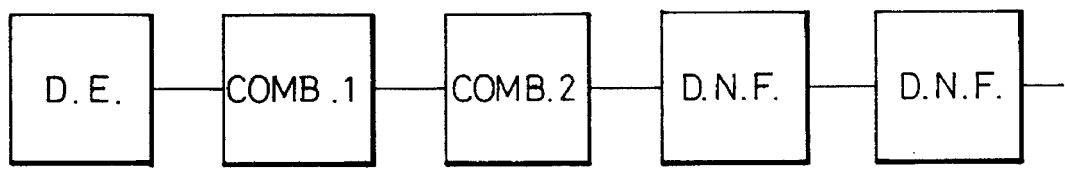
FIGS. 17 to 20 each are a block diagram showing a manner of combination between components of a contaminated air purifying apparatus according to the present invention.
Figure 18:
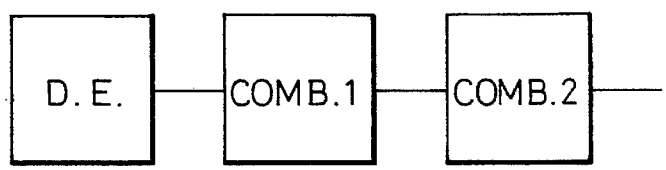
Figure 19:
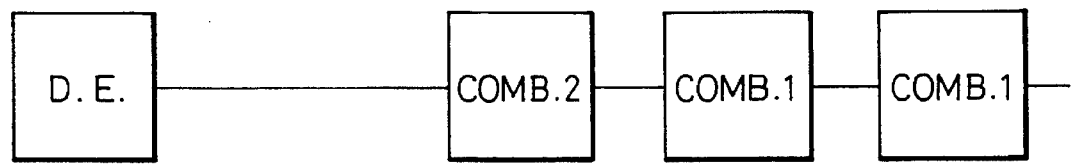
Figure 20:
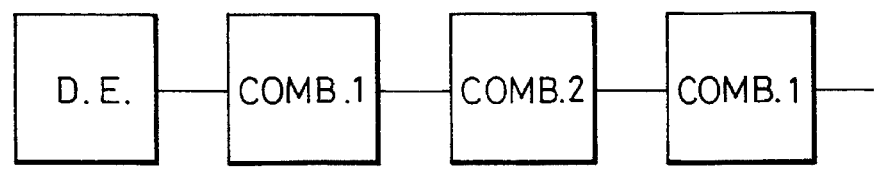

The exhaust gas flow path for exhaust gas of the combustion engine is varied in temperature depending on a position thereof. More particularly, a portion of the exhaust gas flow path in proximity to the combustion engine is increased in temperature and gradually decreased in temperature with an increase in distance from the combustion engine. Also, materials to be used each have a temperature suitable therefor. For example, carbon fiber and carbon particles generally exhibit a satisfactory function at a temperature of about 550° C. or below. Therefore, the components Comb. 2 and D.N.F. containing the carbon fiber or carbon particles each are preferably arranged so as to interpose the component Comb. 1 between the component and the diesel engine D.E. as shown in FIGS. 17, 18 and 20. Alternatively, they may be preferably arranged so as to be spaced at a predetermined interval or more from the diesel engine D.E. as shown in FIG. 19. Also, it is often required to arrange the components Comb. 2 and D.N.F. in proximity to a combustion site from a structural viewpoint of the combustion engine or treat exhaust gas of an excessively increased temperature. In this instance, a cooling fin for cooling the exhaust gas may be provided at any desired position in the exhaust gas flow path. Such arrangement of the cooling fin permits the components Comb. 2 and D.N.F. to be located in close proximity to the combustion engine. Also, this permits the exhaust gas purifying apparatus to be applied to a combustion engine which discharges exhaust gas of a higher temperature.

Figure 21:
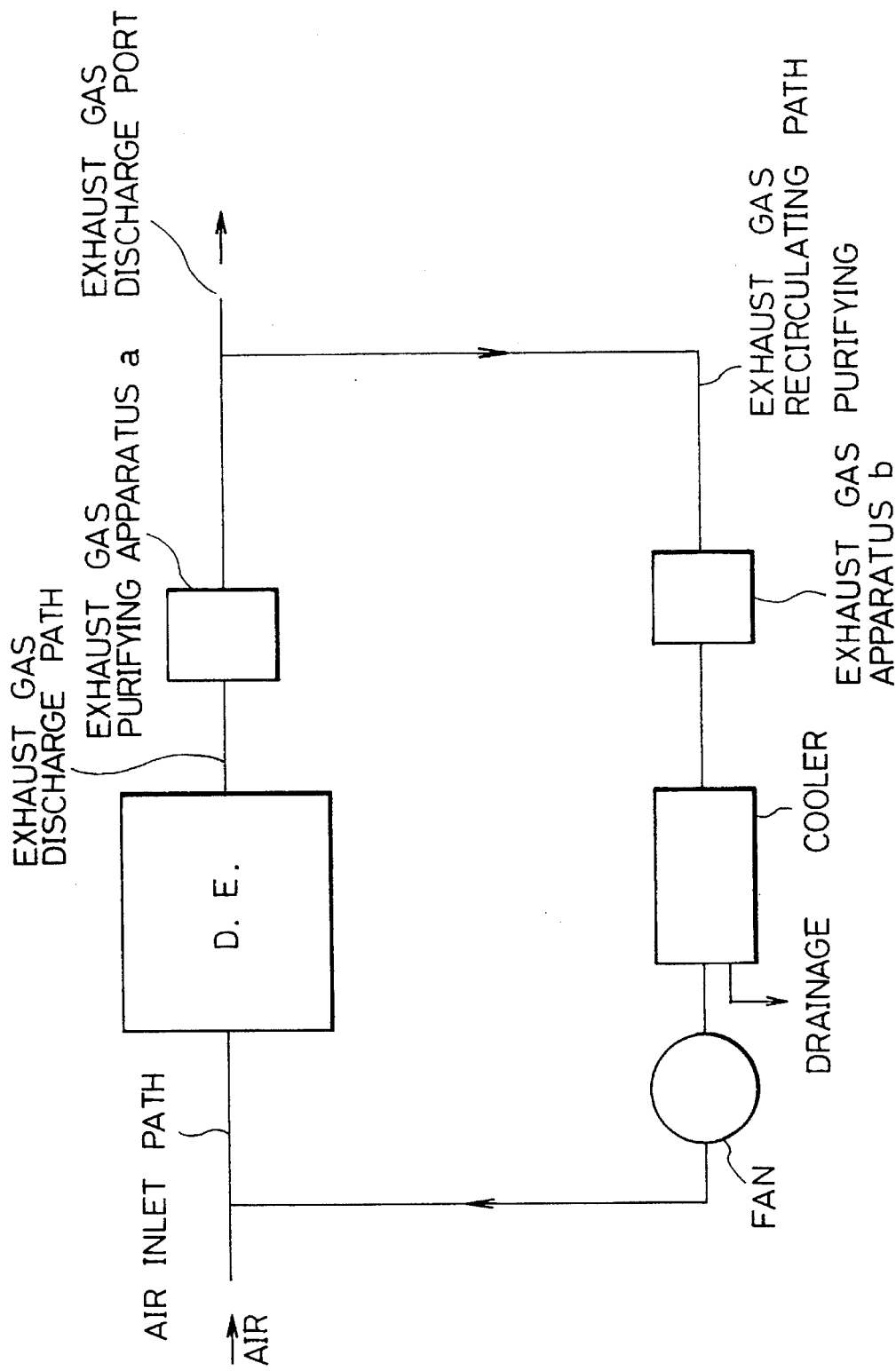
FIG. 21 is a block diagram showing an example of applications of a contaminated air purifying apparatus of the present invention, in which the apparatus is incorporated in a path for recirculating exhaust gas of an automobile.

Referring now to FIG. 21, the exhaust gas purifying apparatus of the present invention which is incorporated in an exhaust gas circulating path of a diesel engine D.E. is illustrated. In the example shown in FIG. 21, an exhaust gas purifying apparatus a is arranged in an exhaust gas discharge path between the diesel engine D.E. and an exhaust gas discharge port. An exhaust gas recirculating path is connected at one end thereof between the exhaust gas purifying apparatus a and the exhaust gas discharge port and at the other end thereof to an air inlet or suction path. The exhaust gas recirculating path is provided with an exhaust gas purifying apparatus b, a cooler and a fan.

Exhaust gas discharged from the diesel engine D.E. is purified by the exhaust gas purifying apparatus a in such a manner as described above. Then, the exhaust gas purified is discharged at a part thereof through the exhaust gas discharge port and the remaining of the exhaust gas is fed to the exhaust gas recirculating path. The exhaust gas fed to the exhaust gas recirculating path is first fed to the exhaust gas purifying apparatus b by the fan. The exhaust gas purifying apparatus b functions to purify the exhaust gas and decrease a temperature of the exhaust gas due to contacting of the exhaust gas with the apparatus b. Then, the exhaust gas purified is further cooled by the cooler. Thus, the exhaust gas is purified twice, to thereby substantially reduce pollution of the cooler, so that the cooler may fully exhibit cooling performance. The air cooled is delivered to the air inlet path and then fed to the diesel engine D.E. together with air introduced into the air inlet path.

The exhaust gas recirculating path constructed as described above permits exhaust gas recirculated to be decreased in temperature, resulting in a temperature difference between the introduced air and the exhaust gas of the diesel engine D.E. being substantially reduced to a level as small as about 28° C. as compared with a temperature difference of about 175° C. in the prior art. Thus, recirculation of the exhaust gas permits fuel consumption to be improved or production of CO to be reduced, so that an output of the diesel engine D.E. may be increased. Further, incorporation of the exhaust gas purifying apparatus in the diesel engine significantly reduces an NOx concentration at an entrance to the engine as compared with that free of the apparatus, to thereby lower a combustion temperature, leading to a decrease in production of NOx.

TEST EXAMPLE 6

An exhaust gas purifying test was carried out using an exhaust gas purifying apparatus constructed in a such manner as shown in FIG. 14. Test conditions described hereinafter were employed. Measurement of a concentration of particulates took place by means of Bosch smoke densitometer according to JIS D8004. A degree of collection of particulates or a degree of dust collection was calculated according to the following expression:

Degree of Dust Collection (%)=(E–F)/E×100 wherein E is an initial concentration of particulates and F is a concentration of particulates after treatment.

Figure 22:
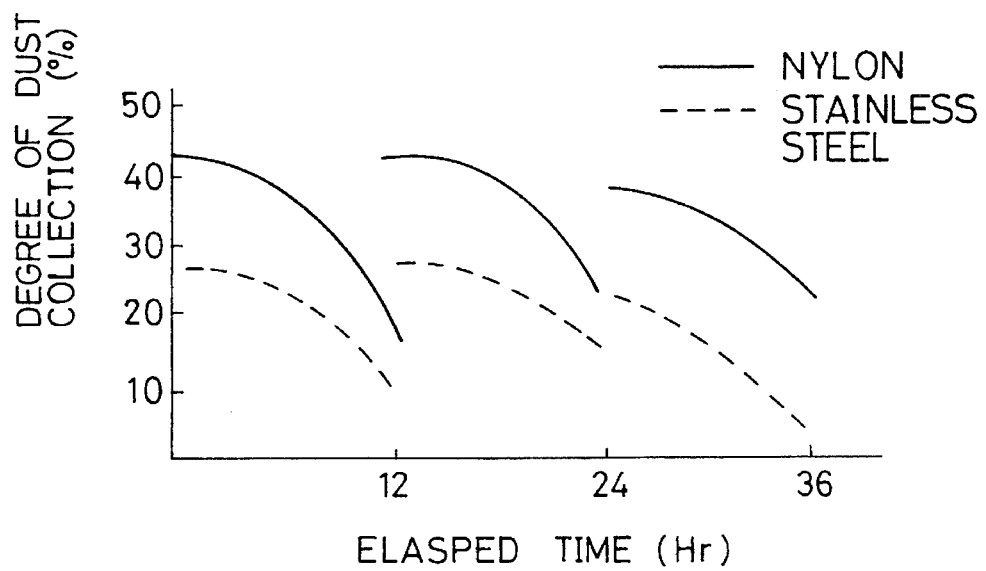
FIG. 22 is a graphical representation showing results of a dust collecting test carried out using a contaminated air purifying apparatus according to the present invention.
Figure 23:
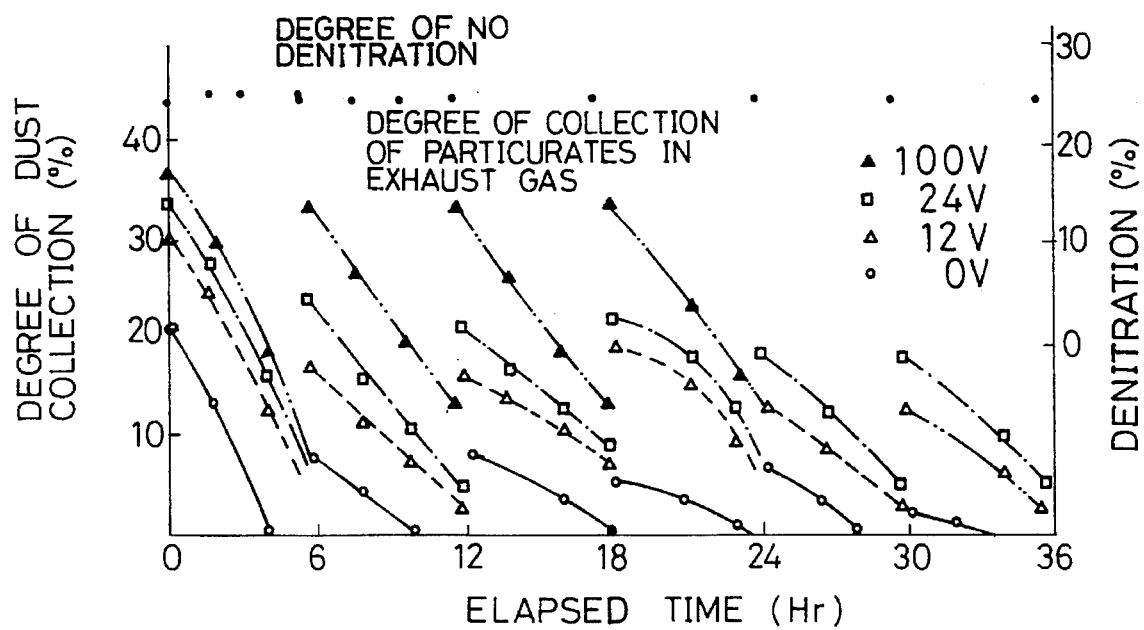
FIG. 23 is a graphical representation showing results of a dust collecting and denitration test carried out using a contaminated air purifying apparatus of the present invention.

The results were as shown in FIG. 22.

Test Conditions

Electrifying filter: Two pieces of stainless steel wire net (60 meshes) were used for an electrifying filter.

Purifying Filter: Twelve pieces of nylon nonwoven fabric (300 mm×300 mm) each having copper powders applied thereto by electroplating and twelve pieces of stainless steel wire net (200 meshes, 300 mm×300 mm) were used for a purifying filter. The purifying filter was detached every twelve hours to remove material adhered thereto, followed by being reused.

Voltage applied: DC 24 V

Engine used: 500 ml diesel engine

Displacement: 1.2 m$^3$/min

TEST EXAMPLE 7

An exhaust gas purifying test was carried out using an exhaust gas purifying apparatus constructed in such a manner as shown in FIG. 16. Test conditions described hereinafter were employed. Measurement of particulates and calculation of a degree of dust collection were carried out as described above. A degree of denitration was obtained according to the following expression:

Degree of Denitration (%)=(G–H)/G×100 wherein G is an initial concentration of NOx and H is a concentration of NOx after treatment.

Test Conditions

Electrifying filter: Two pieces of stainless steel wire net (60 meshes) were used for an electrifying filter.

Purifying filter: Three pieces of stainless steel wire net (60 meshes, 300 mm×300 mm) were used for a purifying filter. The purifying filter was detached every six hours to remove materials adhered thereto, followed by being reused.

Denitration filter: A denitration filter containing a mixture (101 g, thickness: 10 mm) of carbon fiber and carbon particles was arranged at three places. The carbon fiber and carbon particles were treated with a nitric acid solution (63.1%) for two hours. The surface area was 500 m$^2$/g.

Voltage applied: DC 100 V, 24 V, 12 V, 0 V (comparison)

Engine used: 199 ml diesel engine

Displacement: 0.47 m$^3$/min

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A contaminated air purifying apparatus comprising:

a contaminated air influx path;

a DC power supply for providing a voltage between 12 and 500 volts, said power supply having a positive electrode and a negative electrode, an electrifying mesh section containing a porous electrically conductive material and connected to said negative electrode or said DC power supply, said porous electrically conductive material being selected from the group consisting of net of 40 to 500 meshes, punched metal of 40 to 500 meshes and woven fabric of 40 to 500 meshes; and a purifying filter section including a layer containing an electrically conductive material and connected to said positive electrode of said DC power supply;

said purifying filter section being arranged after said electrifying mesh section in a direction of flow of contaminated air in said contaminated air influx path.

2. A contaminated air purifying apparatus as defined in claim 1, wherein said electrifying mesh section contains at least one selected from the group consisting of carbon fiber felt, carbon fiber cloth, stainless steel wire net, stainless steel wire felt, synthetic fiber woven fabric having metal powders applied thereto by electroless plating or electroplating, and synthetic fiber nonwoven fabric having metal powders applied thereto by electroless plating or electroplating.

3. A contaminated air purifying apparatus as defined in claim 2, wherein said carbon fiber felt and carbon fiber cloth each are made of carbon fiber of 200 to 2000 $m^2/g$ in average surface area.

4. A contaminated air purifying apparatus as defined in claim 1, wherein said layer of said purifying filter section containing said electrically conductive material contains one selected from the group consisting of carbon fiber, carbon particles, carbon fiber felt and carbon fiber cloth.

5. A contaminated air purifying apparatus as defined in claim 4, wherein said carbon fiber and carbon particles each have an average surface area of 200 to 2000 $m^2/g$.

6. A contaminated air purifying apparatus as defined in claim 4, wherein said carbon fiber felt and carbon fiber cloth each are made of carbon fiber of 200 to 2000 $m^2/g$ in average surface area.

7. A contaminated air purifying apparatus as defined in claim 1, wherein said layer of said purifying filter section containing said electrically conductive material comprises at least one selected from the group consisting of carbon fiber felt, carbon fiber cloth, stainless steel wire net, stainless steel wire felt, synthetic fiber woven fabric having metal powders applied thereto by electroless plating or electroplating, and synthetic fiber nonwoven fabric having metal powders applied thereto by electroless plating or electroplating.

8. A contaminated air purifying apparatus as defined in claim 1, wherein a plurality of sets of said electrifying mesh section and purifying filter section combinations each including said electrifying mesh section and purifying filter section are arranged.

9. A contaminated air purifying apparatus as defined in claim 1, further comprising means for forcibly sucking air.

10. A contaminated air purifying apparatus as defined in claim 1, wherein said DC power supply comprises a cell and said contaminated air purifying apparatus constitutes a mask.

11. A contaminated air purifying apparatus as defined in claim 10, wherein said mask includes an outer mesh section constituting an outermost layer through which contaminated air is introduced into said mask and an inner mesh section constituting an innermost layer.

12. A contaminated air purifying apparatus as defined in claim 1, further comprising a high efficiency particulate absolute filter section arranged on a downstream side based on said purifying filter section in said contaminated air influx path.

13. A contaminated air purifying apparatus as defined in claim 12, further comprising an axial blower or a cirrocco fan.

14. A contaminated air purifying apparatus as defined in claim 1, further comprising a denitration filter section arranged in said contaminated air influx path;

said denitration filter section including a layer containing one of carbon fiber and carbon particles.

15. A contaminated air purifying apparatus as defined in claim 14, wherein said carbon fiber and carbon particles each have an average surface area of 200 to 2000 $m^2/g$.

16. A contaminated air purifying apparatus as defined in claim 14, further comprising a cooling means.

17. A contaminated air purifying apparatus as defined in claim 1, further comprising means for forcibly sucking and discharging air.

18. A contaminated air purifying apparatus as defined in claim 1, wherein said electrifying mesh section is structured and arranged to only electrostatically negatively charge particles in the contaminated air path passing through said electrifying mesh section, and said purifying filter section is structured and arranged to electrically adsorb the negatively charged particles.

19. A contaminated air purifying apparatus as defined in claim 1, wherein the only electrically charged element in said contaminated air influx path prior to said purifying filter section is said electrifying mesh section.

* * * * *